US012613907B1

(12) United States Patent
Mo et al.

(10) Patent No.: US 12,613,907 B1
(45) Date of Patent: Apr. 28, 2026

(54) BITMASK ENCODING-BASED PERSONALIZED STYLE GENERATION

(71) Applicant: eBay Inc., San Jose, CA (US)

(72) Inventors: Cairo Mo, Brooklyn, NY (US); Lili Weng, Shanghai (CN); Venkatesh Thirupathisamy, Fremont, CA (US); Nick Berry Sinklier, Lake Oswego, OR (US); Pak Tung Siu, Portland, OR (US); Samuel Patrick Cooney, Beaverton, OR (US); Esmerly Sime Segura, Long Island City, NY (US); Matthew Kyle Gearhart, Portland, OR (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 18/999,740

(22) Filed: Dec. 23, 2024

(51) Int. Cl.
*G06F 16/50* (2019.01)
*G06F 16/535* (2019.01)
*G06F 16/538* (2019.01)

(52) U.S. Cl.
CPC .......... *G06F 16/535* (2019.01); *G06F 16/538* (2019.01)

(58) Field of Classification Search
CPC ............................. G06F 16/535; G06F 16/538
See application file for complete search history.

(56) References Cited

U.S. PATENT DOCUMENTS

| | | | |
|---|---|---|---|
| 8,165,414 B1 * | 4/2012 | Yagnik .................... | G06F 16/41 |
| | | | 706/20 |
| 9,886,182 B1 * | 2/2018 | Minks-Brown ......... | G06F 16/51 |
| 2020/0045354 A1 * | 2/2020 | Gao ......................... | G06N 3/04 |
| 2021/0012031 A1 * | 1/2021 | Rich ................... | G06F 21/6245 |
| 2022/0171874 A1 * | 6/2022 | Lundbæk ............... | G06N 20/00 |
| 2025/0068893 A1 * | 2/2025 | Bradea ................. | G06N 3/0475 |
| 2025/0291836 A1 * | 9/2025 | Fatal .................... | G06F 16/383 |

* cited by examiner

*Primary Examiner* — Kristopher Andersen
(74) *Attorney, Agent, or Firm* — FIG. 1 Patents

(57) ABSTRACT

Bitmask encoding-based personalized style generation is described. A personalization system presents different instances of digital content in a user interface and prompts a user to indicate interest or disinterest in an individual digital content items. Based on the input indicating interest or disinterest, a bitmask encoding is generated and returned to the personalization system. The personalization system queries a database to identify respective instances of digital content that correspond to each binary value included in the bitmask encoding, which is then used to generate a prompt that causes a machine learning system to generate a personalized style for the user from which the favorable or unfavorable indications were received. The machine learning system generates a personalized style for an individual and identifies different instances of digital content of interest to the individual, and the personalized style is used to generate a user interface for the individual.

20 Claims, 8 Drawing Sheets

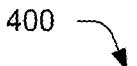

400

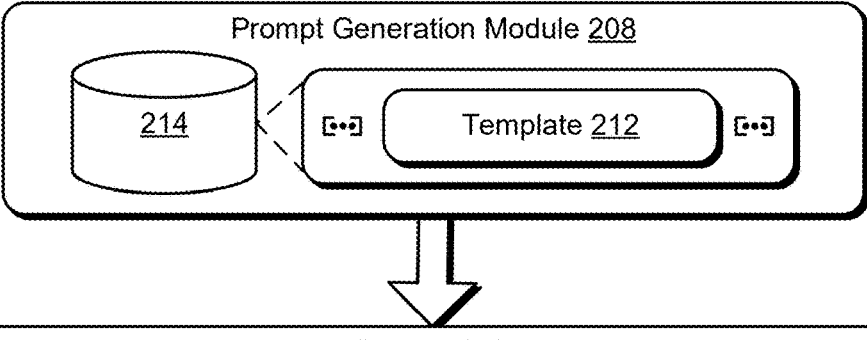

Prompt Generation Module 208

214

[←•→]   Template 212   [←•→]

Prompt 210

402

Objective: You are an expert in determining somebody's style based on things they like or dislike. Identify a user's [PERSONALIZED STYLE] based on their [LIKED ITEMS] and [DISLIKED ITEMS] for an [ITEM CATEGORY]. For the [PERSONALIZED STYLE], identify [NEW ITEMS] that are different from the [LIKED ITEMS] and the [DISLIKED ITEMS].

404

- Infer multiple [PERSONALIZED STYLES] for the [ITEM CATEGORY].
- For each of the [PERSONALIZED STYLES], imagine an example persona of a user who has this style.
- For each of the [PERSONALIZED STYLES], ideate five [NEW ITEMS] that belong to the style that the example persona would like.
- For each of the [PERSONALIZED STYLES], create a catchy tagline in the form of a sentence that would make the style more attractive to the example persona.
- Describe the example persona in a [SHORT PROFILE], three sentences maximum, that describes a semi-fictional representation of a target user.
- For each [NEW ITEM], describe with an [ITEM CATEGORY], a [STYLE NAME], and an [ITEM TITLE]
- Present attributes for each [NEW ITEM] in a [DEFINED FORMAT]

*Fig. 4*

600

602
Display a plurality of instances of digital content in a defined sequence

604
Receive input indicating a favorable reaction of an unfavorable response to each of the plurality of instances of digital content Yes

606
Favorable response?

No

608
Output a first binary value

610
Output a second binary value

612
Generate a bitmask encoding by combining the binary values into a string based on the defined sequence

614
Output at least one item associated with a personalized style generated based on the bitmask encoding

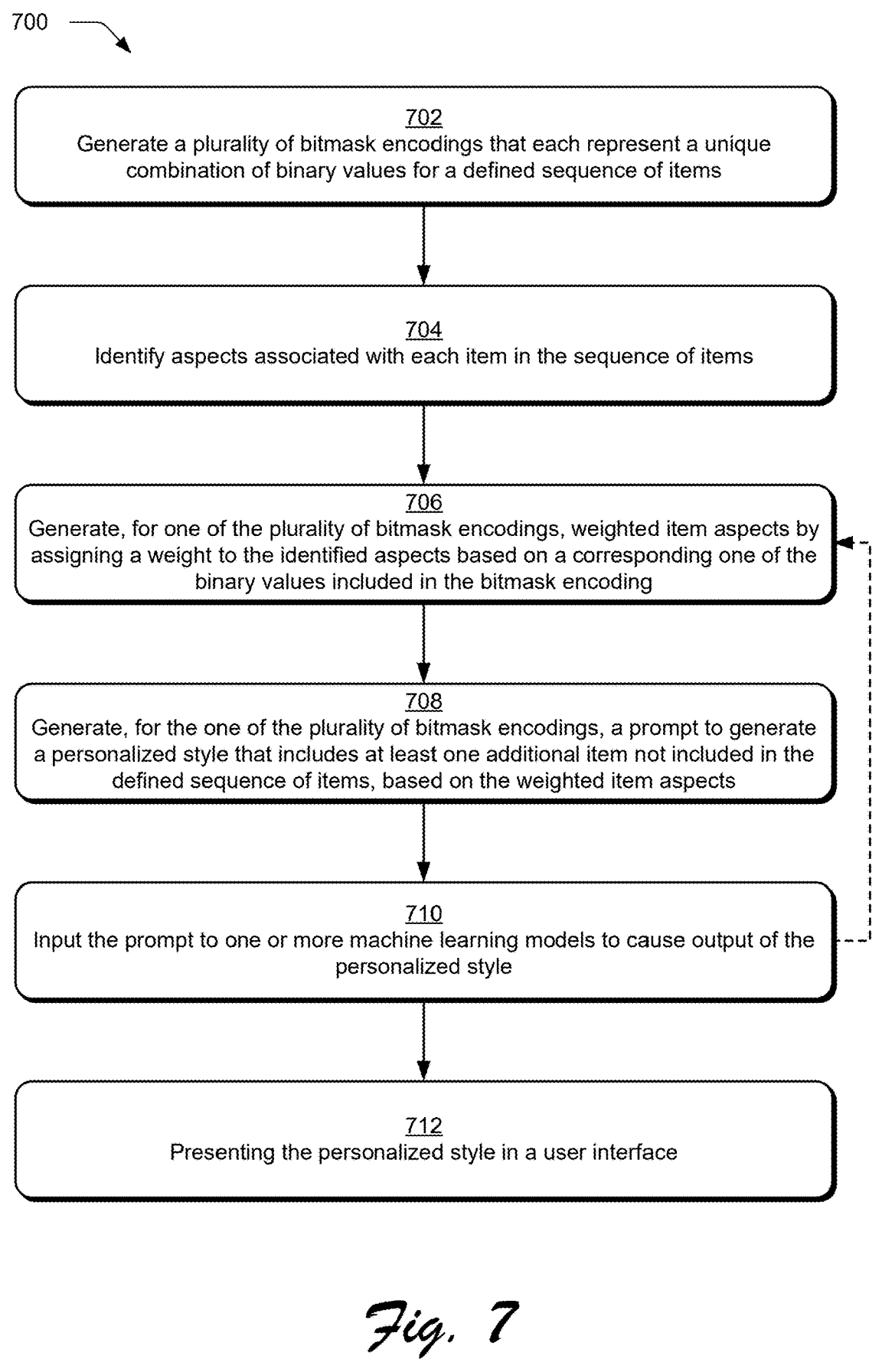

702
Generate a plurality of bitmask encodings that each represent a unique combination of binary values for a defined sequence of items

704
Identify aspects associated with each item in the sequence of items

706
Generate, for one of the plurality of bitmask encodings, weighted item aspects by assigning a weight to the identified aspects based on a corresponding one of the binary values included in the bitmask encoding

708
Generate, for the one of the plurality of bitmask encodings, a prompt to generate a personalized style that includes at least one additional item not included in the defined sequence of items, based on the weighted item aspects

710
Input the prompt to one or more machine learning models to cause output of the personalized style

712
Presenting the personalized style in a user interface

*Fig. 7*

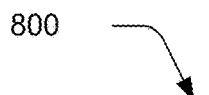
800
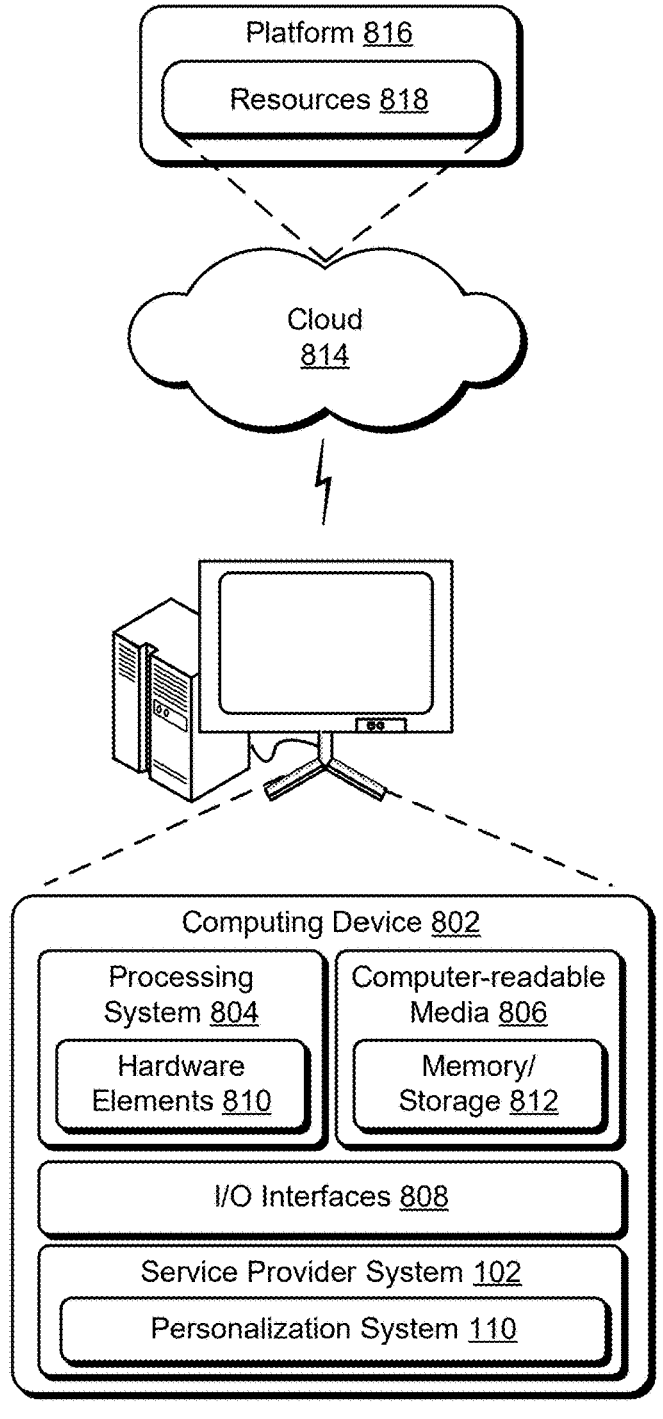
*Fig. 8*

BITMASK ENCODING-BASED PERSONALIZED STYLE GENERATION

BACKGROUND

With the continuous development of computing device technologies, the availability of information, data media, and other content on digital platforms (e.g., digital marketplaces), continues to increase. This growing influx of digital content provides users with an unprecedented variety of choices. However, it is challenging for a user to efficiently navigate the ever-growing number of options to arrive at digital content of genuine interest. As users attempt to sift through a large volume of options, computing device resources (e.g., processing power, memory, network bandwidth, etc.) are often needlessly expended, leading to inefficiencies and wasted computational capacity. Thus, there remains a need to present digital content in a manner that optimizes computational resource usage.

SUMMARY

Bitmask encoding-based personalized style generation is described. A personalization system presents different instances of digital content (e.g., images depicting items for sale on a digital marketplace, artwork, audio, video, etc.) in a user interface. In some implementations, the different instances of digital content are selected by the personalization system based on previous input to the user interface, such as inputs defining search queries, input browsing digital content on one or more platforms, combinations thereof, and so forth. The different instances of digital content are presented in the user interface to prompt input in the form of a directional swipe gesture to indicate interest or disinterest in an individual instance of digital content.

Based on the input indicating interest or disinterest in each instance of digital content, a bitmask encoding is generated by a device displaying the user interface and returned to the personalization system. The personalization system queries a database to identify respective instances of digital content that correspond to each binary value included in the bitmask encoding, and optionally identifies attributes associated with one or more of the instances of digital content. Each instance of digital content, and optionally identified attributes thereof, are then weighted by the personalization system based on the binary indication of favorable or unfavorable as set forth in the bitmask encoding. The weighted information is then used to generate a prompt that causes a machine learning system to generate a personalized style for the user from which the favorable or unfavorable indications were received.

For instance, the personalization system generates a large language model (LLM) prompt by updating fields of a template that instructs the LLM to identify a personalized style for an individual based on their feedback indicating like or dislike of a given instance of digital content. The prompt further instructs the LLM to identify different instances of digital content that would be perceived as favorable for the individual and to group those different instances of digital content as being associated with the personalized style. Instances of digital content associated with a user's personalized style are then output for display in a user interface presented to the user.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 4 depicts a system in an example implementation showing operation of a prompt generation module of the personalization system of FIG. 1 as generating a prompt based on weighted item aspects derived from a bitmask encoding.

FIG. 6 depicts a procedure in an example implementation of generating a bitmask encoding and outputting a display of a personalized style generated based on the bitmask encoding.

FIG. 7 depicts a procedure in an example implementation of generating a personalized style based on a bitmask encoding and presenting the personalized style in a user interface.

FIG. 8 illustrates an example system including various components of an example device that can be implemented as any type of computing device as described and/or utilize with reference to the previous figures to implement the techniques described herein.

DETAILED DESCRIPTION

Overview

Figure 1:
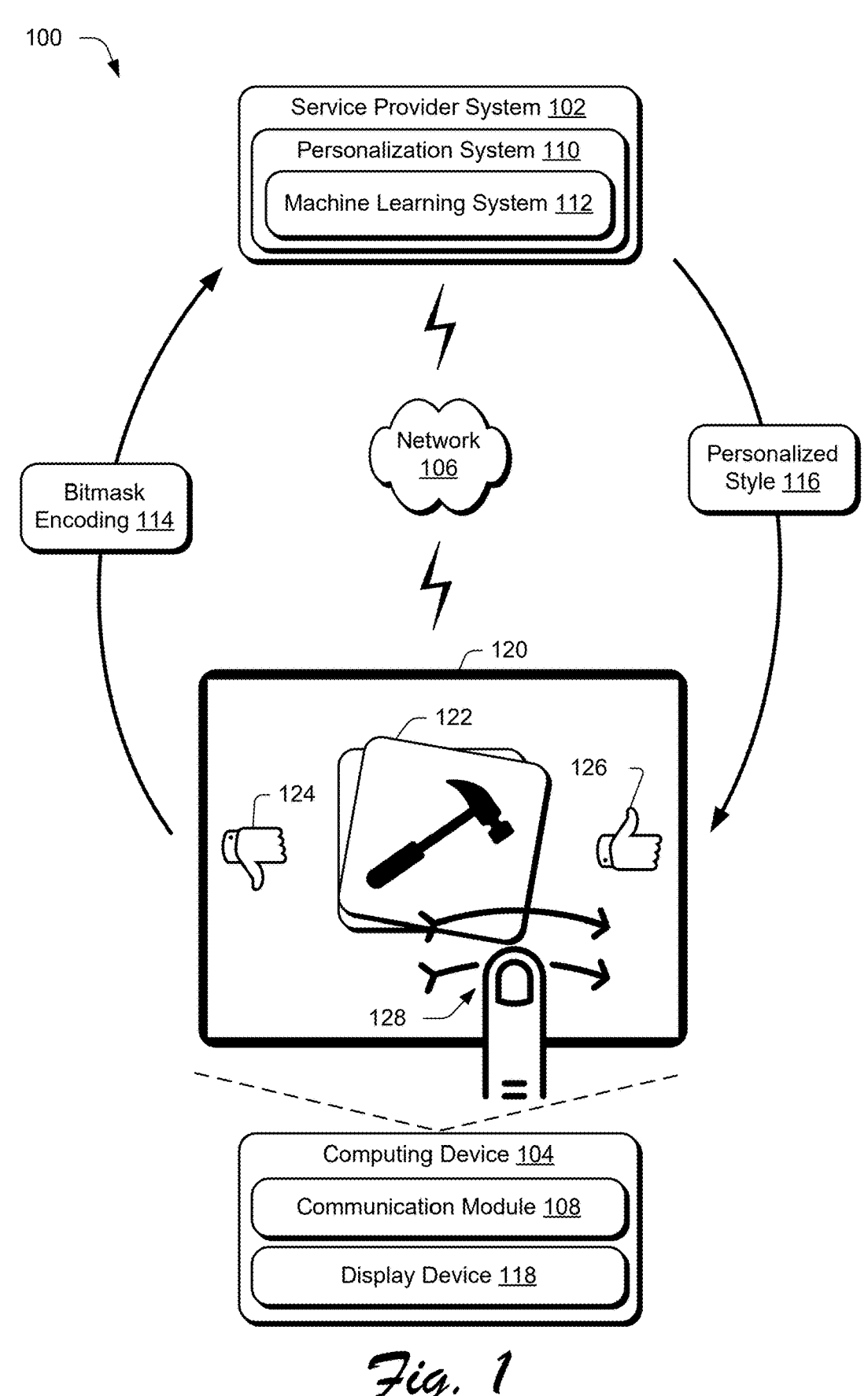
FIG. 1 is an illustration of a digital medium environment in an example implementation that is operable to employ the bitmask encoding-based personalized style generation techniques described herein.

With the exponential growth of digital content on platforms such as digital marketplaces, users are increasingly overwhelmed by the sheer volume of available options. This proliferation makes it challenging for users to efficiently navigate and discover content that genuinely interests them. Consequently, conventional systems and techniques force users to manually sift through vast amounts of data, which unnecessarily expends computing resources, such as including processing power, memory, and network bandwidth. Thus, conventional techniques not only degrade user experiences, but lead to inefficiencies and wasted computational capacity.

To address these technical challenges facing conventional systems, bitmask encoding-based personalized style generation techniques are described. In implementations, a personalization system presents different instances of digital content to users within an intuitive user interface, often employing a deck-of-cards layout where each card represents an instance of digital content such as an image, artwork, audio, video clip, and so forth. Instances of digital content represented by the deck of cards are arranged in a defined sequence. In some implementations, instances of digital content included in the defined sequence are selected by the personalization system based on prior user interactions, including search queries and browsing history, to promote relevance with a viewing user.

Users provide feedback through simple directional swipe gestures on each card, indicating interest or disinterest in the presented content. Each swipe action corresponds to a binary value that succinctly captures the user's preferences across multiple content instances, and the binary values are combined into a string to generate a bitmask encoding. This compact binary representation is generated locally on the user's computing device and transmitted to the personalization system, minimizing data transfer and preserving user privacy.

The personalization system maps each binary value in the bitmask encoding to its corresponding content instance and, optionally, to associated attributes such as category, style, or other metadata. The personalization system assigns weights to these instances and attributes based on the user's favorable or unfavorable indications as set forth in the bitmask encoding. Leveraging this weighted information, the system constructs a prompt for a machine learning model, such as a large language model (LLM).

The prompt instructs the LLM to generate a personalized style profile for the user by analyzing the liked and disliked content and corresponding attributes. The LLM identifies new instances of digital content that align with the user's preferences that are distinct from the items initially presented in the deck of cards from which the bitmask encoding was generated. The new instances of digital content are grouped under the personalized style and are delivered to the user's interface for display.

In some implementations, the personalization system advantageously pre-generates personalized styles for all possible combinations of values that may be included in a bitmask encoding generated from the defined sequence of content items. Advantageously, generating personalized styles in advance of receiving a bitmask encoding from a user device enables the personalization system to retrieve personalized styles in real time from a style database without the need for computationally intensive operations typically associated with conventional search and recommendation algorithms. By avoiding on-the-fly complex computations and extensive database queries, the system significantly reduces computational overhead, optimizes resource usage, and enhances the performance of both server-side and client-side computing devices.

The described techniques thus provide users with swift and relevant content recommendations, thereby improving the overall user experience. The described techniques address the technical problems of navigating large volumes of digital content and inefficient computational resource utilization by introducing a scalable, efficient, and user-centric personalization system. Further discussion of these and other examples is included in the following description and illustrated with respect to the corresponding figures.

In the following discussion, an example environment is described that is configured to employ the techniques described herein. Example procedures are also described that are configured for performance in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ the bitmask encoding-based personalized style generation techniques described herein. The illustrated environment 100 includes a service provider system 102 and a computing device 104 that are communicatively coupled, one to another, via a network 106. Computing devices, such as one or more computing devices represented by the service provider system 102 and/or the computing device 104, are configurable in a variety of manners.

A computing device, for instance, is configurable as a desktop computer, a laptop computer, a mobile device (e.g., assuming a handheld configuration such as a tablet or mobile phone), and so forth. Thus, a computing device ranges from full resource devices with substantial memory and processor resources (e.g., personal computers, game consoles) to a low-resource device with limited memory and/or processing resources (e.g., mobile devices). Additionally, although a single computing device is shown and described in instances in the following discussion, a computing device is also representative of a plurality of different devices, such as multiple servers utilized by an entity to perform operations "over the cloud" for the service provider system 102 and as further described in relation to FIG. 8.

The service provider system 102 is representative of a combination of hardware and software resources (e.g., instructions stored on a computer-readable storage medium that are executed by at least one processing device) to provide digital services (e.g., digital services that are remotely available to the computing device 104 via the network 106). As an example, a digital service offered by the service provider system 102 includes a digital marketplace platform, such as a cloud-based, modular architecture that enables secure and scalable transactions between buyers and sellers of products or services listed for sale via digital marketplace listings.

In implementations, such digital services offered by the service provider system 102 are built on microservices that handle various digital marketplace functions such as user authentication, item listing management, payment processing, order fulfillment, and so forth. In some implementations, digital services offered by the service provider system 102 are extendable to third-party integrations, such that functionality of the service provider system 102 is integrated or otherwise extended to other digital services. As described in further detail below with respect to FIG. 8, the service provider system 102 is representative of a distributed data storage system, which is configured to ensure fault tolerance and implements encryption protocols to protect sensitive user data, transaction data, and so forth.

In the specific example context of a digital marketplace service provided by the service provider system 102, the service provider system 102 incorporates search and recommendation algorithms to personalize an experience of a user interfacing with the digital marketplace of the service provider system 102. Continuing this example context of a digital marketplace service, the service provider system 102 implements an access control system to ensure that certain resources are restricted to authorized entities, provide analytics to marketplace activity, and so forth.

In the illustrated example of FIG. 1, computing device 104 includes a communication module 108 to access digital services (e.g., via the network 106) offered by the service provider system 102. The communication module 108, for instance, is representative of a browser configured to access a digital marketplace of the service provider system 102 via the Internet, an application provided by the service provider system 102, combinations thereof, and so forth. The communication module 108 is thus representative of functionality of the computing device 104 to communicate data to, and receive data from, the service provider system 102.

The service provider system 102 is depicted as including a personalization system 110. Although illustrated and described herein as being implemented at the service provider system 102, in some implementations the personalization system 110 is implemented locally at the computing device 104. The personalization system 110 implements a machine learning system 112 and is configured to receive a bitmask encoding 114 from the computing device 104. The bitmask encoding 114 represents a string of binary values (e.g., ones and zeroes), where individual values represent a favorable or unfavorable disposition, by a user of the computing device 104, to an instance of digital content, such as an image of an item for sale by a digital marketplace service provided by the service provider system 102.

The service provider system 102 leverages the machine learning system 112 to generate, based on the bitmask encoding 114, a personalized style 116 for the user of the computing device 104. As described in further detail below, the personalized style 116 is representative of one or more instances of digital content, different than instances of digital content from which the bitmask encoding 114 was generated, and likely of interest to the user of the computing device 104. For instance, in the context of the service provider system 102 providing a digital marketplace service, different instances of digital content included in the personalized style 116 include listings for sale of items that are identified to be of interest to the user of the computing device 104.

The computing device 104 is further configured as including a display device 118. The display device 118 is representative of hardware configured to output visual information to one or more users of the computing device 104. For instance, the display device 118 is representative of a monitor (e.g., an external screen connected to and optionally integrated into a form factor of the computing device 104). Alternatively or additionally, the display device 118 is representative of a touchscreen that functions both to output visual information and receive input from a user of the computing device 104. Alternatively or additionally, the display device 118 is representative of a projector configured to display visual information on relatively large surfaces. Alternatively or additionally, the display device 118 is representative of a wearable device (e.g., a virtual reality headset) that immerses a user of the computing device 104 in a digital environment. Other examples are contemplated in accordance with the described techniques, such that the display device 118 is representative of a range of different display sizes, resolutions, and configurations for outputting visual information on behalf of the computing device 104.

The display device 118, for instance, outputs a display of a user interface 120 for the service provider system 102. In the illustrated example of FIG. 1, the user interface 120 is depicted as displaying an instance of digital content 122, illustrated as a "top" card on a deck of cards, where each card in the deck corresponds to an instance of digital content. As described herein, individual instances of digital content are configured as images representing items listed for sale on a digital marketplace service provided by the service provider system 102. However, these example descriptions of digital content, and the techniques described herein are extendable to any suitable form of digital content, such as audio and/or video available for playback via a media streaming service provided by the service provider system 102, news articles available for consumption via a publication service provided by the service provider system 102, combinations thereof, and so forth.

In some implementations, the deck of cards including the instance of digital content 122 is populated by the service provider system 102 based on past interactions between the computing device 104 and the service provider system 102. For instance, the service provider system 102 selects instances of digital content for presentation in the deck of cards displayed at the user interface 120 based on search queries (e.g., entered by a user of the computing device 104 via a search function offered by the service provider system 102), past browsing history, previous purchases, saved items, shared items, digital content consumed by the computing device 104 via the service provider system 102, combinations thereof, and so forth.

The user interface 120 is further depicted as displaying indicators positioned adjacent to the deck of cards including the instance of digital content 122. For instance, the illustrated example of FIG. 1 depicts an indicator 124 configured as a "thumbs-down" icon and an indicator 126 configured as a "thumbs-up" icon. In this manner, the indicators positioned adjacent to the deck of cards are configured to represent interest (e.g., positive feedback) or disinterest (e.g., negative feedback) in a displayed instance of digital content (e.g., a top card in the deck). Although configured as thumbs-up and thumbs-down icons positioned to the right and left of the deck of cards, the indicator 124 and the indicator 126 are not so limited, and are implemented in a variety of configurations in accordance with the described techniques. For instance, the indicators 124 and 126 are configurable as any suitable form of icon, text, image, color, combination thereof, and so forth, and may be positioned at any suitable location in the user interface 120.

In implementations, the indicator 124 and the indicator 126 are positioned in a manner that prompts input in the form of a directional swipe gesture to move the instance of digital content 122 towards one of the indicators 124 or 126. For instance, the illustrated example of FIG. 1 depicts a scenario where user input 128 is received at the user interface 120 in the form of a directional swipe gesture that moves the card depicting the instance of digital content 122 off the top of the deck of cards towards the indicator 126 (e.g., indicating interest in the hammer represented by the instance of digital content 122). Once moved off the top of the deck towards indicator 124 or indicator 126, the deck of cards reveals an additional instance of digital content.

Based on a direction of the user input 128 (e.g., swiping towards the indicator 124 or the indicator 126), the computing device 104 generates a value for inclusion in the bitmask encoding 114. For example, in response to detecting user input 128 swiping the instance of digital content 122 towards the indicator 126, the computing device 104 generates a "1" in the bitmask encoding 114 to indicate positive sentiment. Conversely, in response to detecting user input 128 swiping the instance of digital content 122 towards the indicator 124, the computing device 104 generates a "0" in the bitmask encoding 114 to indicate negative sentiment. Alternatively, in some implementations the binary values of the bitmask encoding 114 are reversed, such that a value of zero indicates positive sentiment and a value of one indicates negative sentiment. The computing device 104 is configured to generate the bitmask encoding 114 as including any suitable number of binary values, where each value is representative of a corresponding instance of digital content output in the user interface 120 via the deck of cards (e.g., the instance of digital content 122).

In response to generating a bitmask encoding 114 that includes a threshold number of values, the communication module 108 communicates the bitmask encoding 114 to the service provider system 102 (e.g., via network 106). In implementations, the threshold number of values included in the bitmask encoding 114 is defined by the service provider system 102. Alternatively or additionally, the threshold number of values included in the bitmask encoding 114 is specified via user input at the user interface 120 (e.g., input indicating that a user of the computing device 104 is done with classifying the deck of cards using the directional swipe gesture).

As described in further detail below, the personalization system 110 leverages the machine learning system 112 to generate a personalized style 116 for a user of the computing device 104 based on the bitmask encoding 114. The personalized style 116 is communicated from the service provider system 102 to the computing device 104 (e.g., for display in the user interface 120). An example of a personalized style 116 as output in the user interface 120 is described in further detail below with respect to FIG. 5. In implementations, the personalized style 116 includes at least one additional item of digital content that was not included in the deck of cards from which the bitmask encoding 114 was generated. The machine learning system 112 is configured to identify this additional item of digital content based on the bitmask encoding 114, and does so with an objective of finding an additional item of digital content that is likely to be of interest to a user of the computing device 104.

In implementations, the machine learning system 112 is pre-trained to generate a style database that includes a personalized style for each possible combination of values in a bitmask encoding 114 that can be returned for a sequence of digital content items displayed in the deck of cards via user interface 120. For instance, consider an example scenario where the threshold number of values included in the bitmask encoding 114 is ten, such that the deck of cards including the instance of digital content 122 includes ten cards. From this example deck of cards, there exists 1024 possible different bitmask encodings 114 that can be generated based on the user input 128. Thus, continuing this example scenario, the machine learning system 112 is configured to generate 1024 different personalized styles 116, one for each possible bitmask encoding 114. In implementations, the machine learning system 112 is configured to generate a style database that includes the different personalized styles 116, where each entry in the database is indexed by a corresponding binary string of a bitmask encoding 114. In such implementations, the machine learning system 112 identifies the personalized style 116 by indexing the style database using a received bitmask encoding 114, thus returning a personalized style 116 to the computing device 104 in real time, which is not possible using conventional techniques.

Thus, in contrast to conventional service provider systems 102, which identify items of potential interest by executing a search query that requires significant consumption of computational resources (e.g., high processing device usage, querying of large datasets that exceeds available memory thresholds, retrieving data from disk-based storage, bottlenecking available communication channel bandwidth, etc.), the described techniques identify and return a personalized style 116 in real time using minimal computational resources. Advantageously, the described techniques thus improve performance of one or more computing devices implementing the personalization system 110 by avoiding unnecessary computations and improve an experience of a user of the computing device 104 when interacting with the service provider system 102 via the user interface 120. For a further description of the personalization system 110 generating the personalized style 116 based on the bitmask encoding, consider FIG. 2.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Example Bitmask Encoding-Based Personalized Style Generation

Figure 2:
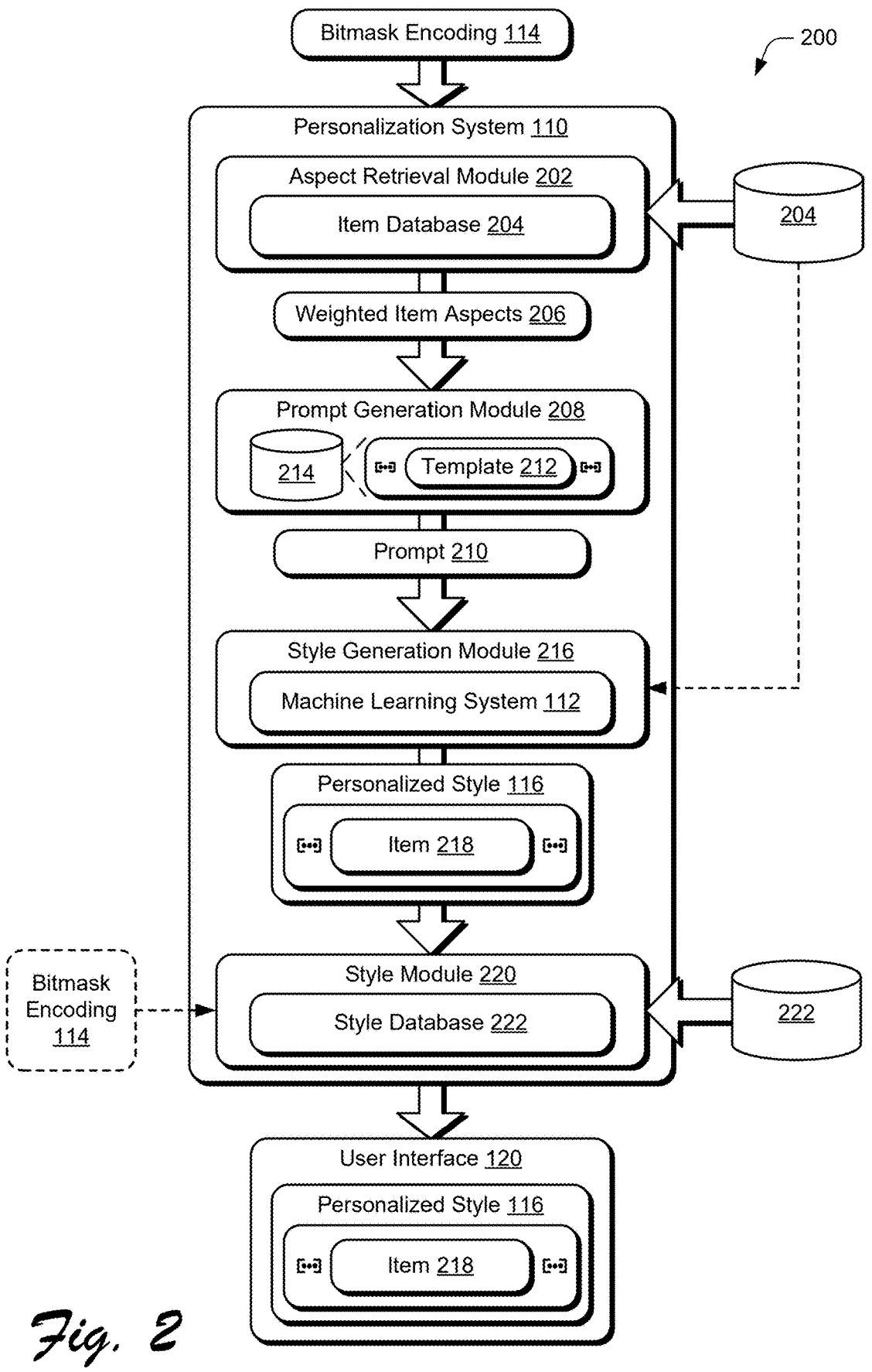
FIG. 2 depicts a system in an example implementation showing operation of the personalization system of FIG. 1 in greater detail as generating a user interface that includes a personalized style based on a bitmask encoding.

FIG. 2 depicts a system 200 in an example implementation showing operation of the personalization system 110 in greater detail as generating a user interface 120 that includes a personalized style 116 based on a bitmask encoding 114. In the illustrated example of FIG. 2, the personalization system 110 includes an aspect retrieval module 202. The aspect retrieval module 202 represents functionality of the personalization system 110 to retrieve information corresponding to each instance of digital content from which the bitmask encoding 114 is generated. For instance, in the example context of digital content representing items for sale on a digital marketplace service offered by the service provider system 102, the aspect retrieval module 202 is configured to query an item database 204 to identify item aspects associated with each of the instances of digital content that individually correspond to a single digit value in the bitmask encoding 114 (e.g., a one or a zero in the string of binary values represented by the bitmask encoding 114).

In implementations, the bitmask encoding 114 corresponds to a defined sequence of digital content items, such that different users are presented with the same sequence of cards in a deck of cards (e.g., the deck of cards including the instance of digital content 122 as depicted in FIG. 1). In this manner, the aspect retrieval module 202 is informed by the personalization system 110 as to a specific instance of digital content that corresponds to each value position in the bitmask encoding 114. For a further description of how individual digits in the bitmask encoding 114 correspond to different instances in a defined sequence of digital content, consider FIG. 3.

Figure 3:
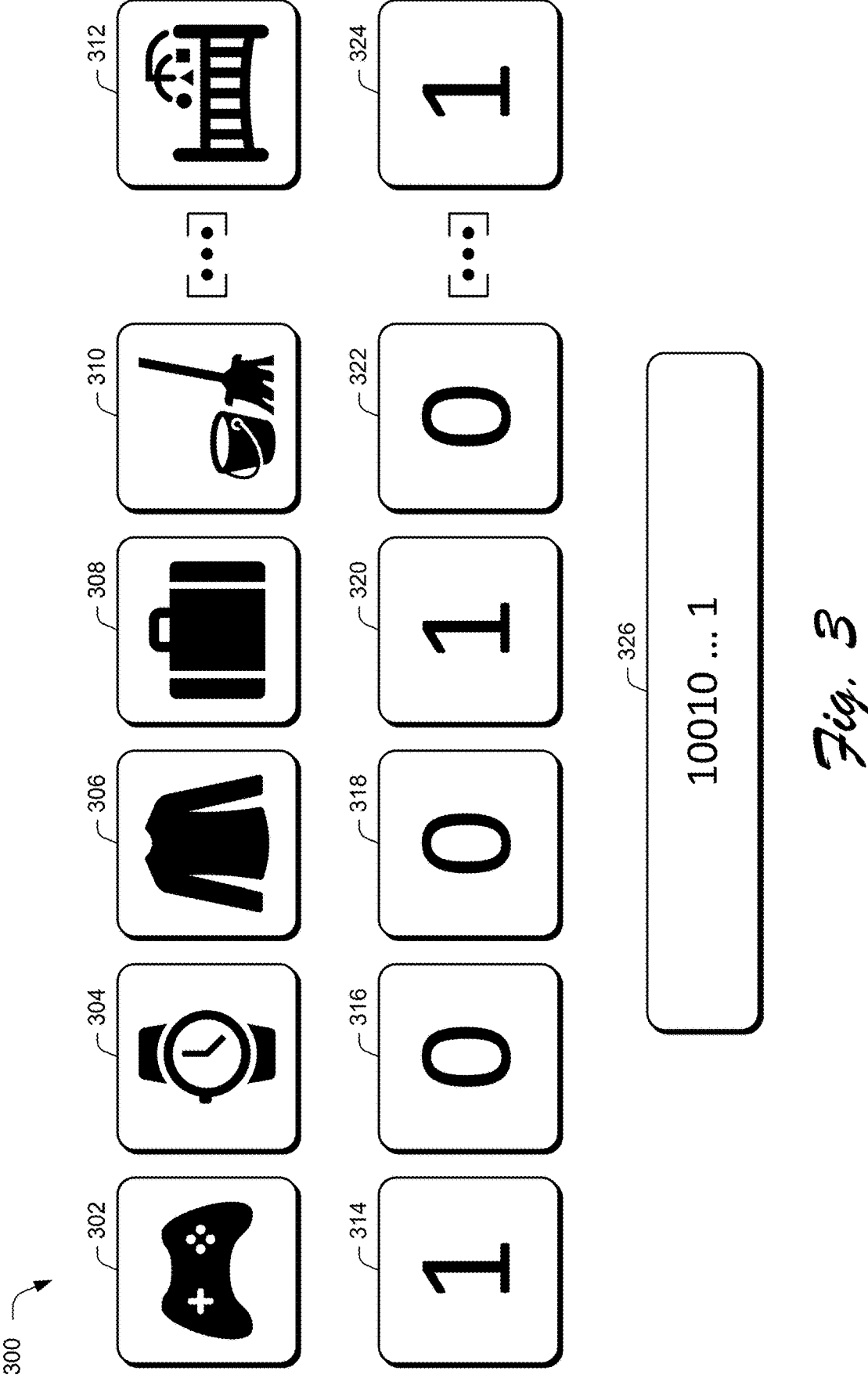
FIG. 3 depicts an example of an implementation of different items of digital content and corresponding values as included in the bitmask encoding used by the personalization system of FIG. 1 to generate a personalized style.

FIG. 3 depicts an example 300 of an implementation of different items of digital content and corresponding values as included in the bitmask encoding 114 used by the personalization system 110 to generate a personalized style 116. In the illustrated example of FIG. 3, a defined sequence of digital content is represented as digital content 302, digital content 304, digital content 306, digital content 308, digital content 310, and digital content 312. The ellipses separating digital content 310 and digital content 312 represent how the described techniques are extendable to any number of instances of digital content, and that the described techniques are not limited to specific quantities of digital content in the referenced examples. The defined sequence of digital content represented in FIG. 3 means that different computing devices display a same deck of cards in a same order, such that digital content 302 represents a first card in the deck, digital content 304 represents a second card in the deck, and so forth, until reaching the final card in the deck, which represents digital content 312.

Based on input at the user interface 120, a binary value (e.g., one or zero) indicating favorable or unfavorable user sentiment to a corresponding instance of digital content is generated by the computing device 104. For instance, in the illustrated example of FIG. 3, value 314 indicates a positive sentiment (e.g., interest) towards the digital content 302. Value 316 indicates a negative sentiment (e.g., disinterest) towards the digital content 304. Value 318 indicates a negative sentiment in the digital content 306, value 320 indicates a positive sentiment towards the digital content 308, value 322 indicates a negative sentiment towards the digital content 310, and value 324 indicates a positive sentiment towards the digital content 312. The respective values 314, 316, 318, 320, 322, and 324 are combined into a binary string of values 326, such that the binary string of values 326 represents the bitmask encoding 114 returned from the computing device 104 to the service provider system 102.

Returning to FIG. 2, because the instances of digital content are presented by the personalization system 110 (e.g., via display at the user interface 120) in a defined order, the aspect retrieval module 202 is informed as to a respective instance of digital content corresponding to each integer position in the bitmask encoding 114. For instance, the personalization system 110 provides the aspect retrieval module 202 with an item identifier of an item offered for sale via a digital marketplace, where each item identifier corresponds to a representation of the respective item as displayed in the deck of cards presented via user interface 120. The aspect retrieval module 202 is configured to compare each item identifier to entries in the item database 204. Entries in the item database 204 represent individual items and metadata that describes aspects of the item (e.g., title, category identifier, item description parameters, price, and so forth).

The aspect retrieval module 202 is configured to output weighted item aspects 206 based on the corresponding value in the bitmask encoding 114. For instance, in an example scenario where an item represented by an instance of digital content is associated with a value in the bitmask encoding 114 indicating positive sentiment, the aspect retrieval module 202 is configured to assign a mathematical weight to attributes associated with the item, where the mathematical weights indicate that positive sentiment is associated with the specific item attributes. As a specific example, if an instance of digital content represents an article of clothing and a corresponding value in the bitmask encoding 114 indicates a negative sentiment, the aspect retrieval module 202 generates weighted item aspects 206 to indicate that negative sentiment is associated with attributes of the article of clothing, such as price, style, material, category, and so forth.

The weighted item aspects 206 are then provided as input to a prompt generation module 208 to generate a prompt 210. The prompt 210 is configured to initiate generation of the personalized style 116 based on the bitmask encoding 114 and the weighted item aspects 206 using one or more machine learning models of the machine learning system 112. The prompt generation module 208 is configured to do so by leveraging one or more templates 212 (illustrated as stored in storage device 214) that are "filled in" by the prompt generation module 208 (e.g., using natural language processing). A specific example of the prompt generation module 208 generating the prompt 210 by filling in one or more templates 212 is described in further detail below with respect to FIG. 4.

The prompt 210 is then provided as input to a style generation module 216, which represents functionality of the personalization system 110 to output the personalized style 116 (e.g., for display in the user interface 120) using one or more trained machine learning models of the machine learning system 112 (e.g., at least one LLM as described in further detail below with respect to FIG. 5).

FIG. 4 depicts a system 400 in an example implementation showing operation of the prompt generation module 208 in greater detail as generating prompt 210 based on weighted item aspects 206 derived from the bitmask encoding 114. In the illustrated example of FIG. 4, the text of the prompt 210 differentiates text of a template 212 from text input by the prompt generation module 208 (e.g., based on the bitmask encoding 114 and/or the weighted item aspects 206) using brackets. For instance, the prompt generation module 208 generates the prompt 210 by inserting text describing the weighted item aspects 206 at positions of the one or more templates 212 enclosed by brackets.

The prompt 210, for instance, is depicted as defining the following objective for the style generation module 216 using a first template 402: "You are an expert in determining somebody's style based on things they like or dislike. Identify a user's [PERSONALIZED STYLE] based on their [LIKED ITEMS] and [DISLIKED ITEMS] for an [ITEM CATEGORY]. For the [PERSONALIZED STYLE], identify [NEW ITEMS] that are different from the [LIKED ITEMS] and the [DISLIKED ITEMS]." In this prompt 210, the [PERSONALIZED STYLE] corresponds to the personalized style 116 to be generated by the style generation module 216. The [LIKED ITEMS] and the [DISLIKED ITEMS] correspond to items as represented by individual instances of digital content from which the bitmask encoding 114 was generated.

For instance, instances of digital content having an assigned value of one in the bitmask encoding 114 are representative of [LIKED ITEMS] and individual instances of digital content having an assigned value of zero in the bitmask encoding 114 are representative of [DISLIKED ITEMS]. Similarly, item aspects in the weighted item aspects 206 having mathematical weights indicating positive sentiment are representative of information that the prompt generation module 208 uses to populate [LIKED ITEMS] portions of the first template 402. Item aspects in the weighted item aspects 206 having mathematical weights indicating negative sentiment are representative of information that the prompt generation module 208 uses to populate [DISLIKED ITEMS] portions of the first template 402. The [ITEM CATEGORY] portion of the first template 402 is representative of a classification for which the personalized style 116 is generated.

For instance, the personalization system 110 is configured to generate personalized styles 116 for different classifications of digital content, such that a first sequence of digital content representation is presented for a first category (e.g., clothing items), a second sequence of digital content representations is presented for a second category (e.g., household goods), a third sequence of digital content representations is presented for a third category (e.g., sporting equipment), and so forth. In implementations, the [ITEM CATEGORY] corresponding to the sequence of digital content representations from which a particular bitmask encoding 114 was generated is predefined by the personalization system 110 and communicated to the prompt generation module 208 along with the weighted item aspects 206.

The prompt 210 is further generated to task the style generation module 216 with identifying [NEW ITEMS], that are different from the items represented by instances of digital content items in the stack of cards from which the bitmask encoding 114 was generated. In this manner, the prompt 210 instructs the style generation module 216 to identify different items that are likely of interest, based on the positive or negative sentiment indicated in the bitmask encoding 114 and the weighted item aspects 206 derived from the bitmask encoding 114. In implementations, the style generation module 216 identifies the [NEW ITEMS] based on information included in the item database 204. Alternatively or additionally, the style generation module 216 identifies [NEW ITEMS] using a database other than the item database 204 from which the weighted item aspects 206 were derived.

The prompt 210 is further refined using a second template 404, which constrains a structure of the personalized style 116 as output by the style generation module 216. Specifically, the second template 404 ensures that the style generation module 216 is instructed to infer multiple [PERSONALIZED STYLES] for the [ITEM CATEGORY]. The second template 404 further instructs the style generation module 216, for each of the [PERSONALIZED STYLES], to imagine an example persona of a user who has this style, and to ideate five [NEW ITEMS] that belong to the style that the example persona would like. In this manner, the second template 404 constrains a number of [NEW ITEMS] that are to be output as part of the personalized style 116 without constraining the style generation module 216 to infer that only a single personalized style 116 exists given the input of the prompt 210.

The second template 404 further instructs the style generation module 216 to, for each of the [PERSONALIZED STYLES], create a catchy tagline in the form of a sentence that would make the style more attractive to the example persona. The second template 404 further instructs the style generation module 216 to describe the example persona in a [SHORT PROFILE], three sentences maximum, that describes a semi-fictional representation of a target user. The second template 404 further instructs the style generation module 216 to generate, for each [NEW ITEM], a description of a corresponding [ITEM CATEGORY], a [STYLE NAME], and an [ITEM TITLE]. Thus, the prompt 210 instructs the style generation module 216 to craft, a tagline designed to appeal to the example persona for which the personalized style 116 is generated. Each new item included in the personalized style 116 will be described with details such as the item category, style name, and item title, along with its attributes (e.g., as derived from the item database 204). Additionally, the second template 404 instructs the style generation module 216 to present the attributes for each [NEW ITEM] included in a personalized style 116 in a [DEFINED FORMAT]. In implementations, the [DEFINED FORMAT](e.g., JSON) is designated by the personalization system 110, designated by a user of the service provider system 102, or combinations thereof.

In this manner, the prompt 210 causes the machine learning system 112 implemented by the style generation module 216 to infer preferences based on weighted item aspects when generating a plurality of personalized styles that includes the personalized style 116. For instance, the second template 404 causes the style generation module 216 to analyze patterns in the weighted item aspects and identify underlying preferences that are not explicitly stated. Example inferred preferences include color schemes, design aesthetics, product categories, price ranges, brands, and other attributes that are common among items with positive weights, attributes that are absent from items with negative weights, or combinations thereof. In some implementations, the style generation module 216 leverages historical data from other users with similar weighted item aspects to make more accurate inferences regarding preferences associated with a personalized style 116. The inferred preferences are useable to identify new items for inclusion in the personalized style 116 that align with an individual's tastes, even if those items differ in some ways from the specific items in the deck of cards from which the bitmask encoding 114 was generated.

Returning to FIG. 2, the prompt generation module 208 inputs the prompt 210 (e.g., as filled out using the bitmask encoding 114, the weighted item aspects 206, the first template 402, and the second template 404) to the style generation module 216. The prompt 210 causes the machine learning system 112 to generate a personalized style including at least one item 218. For instance, in the context of the illustrated example of FIG. 4, at least one item 218 represents one of the five [NEW ITEMS] that the style generation module 216 is tasked to output as part of the personalized style 116. In the example context of a digital marketplace service provided by the service provider system 102, the at least one item 218 corresponds to a digital representation of an item listed for sale at the digital marketplace service.

The personalized style 116, including the at least one item 218 output by the style generation module 216, is communicated to a style module 220 for storage in a style database 222. In implementations, the personalization system 110 is configured to repeat this process of generating a personalized style 116 for each possible combination of integer values that can be represented by the bitmask encoding 114. For instance, in an example scenario where the bitmask encoding 114 is a string of ten integers having possible values of one or zero, the personalization system 110 is configured to generate 1024 different personalized styles 116, each of which include at least one item 218. The different personalized styles 116 are stored in the style database 222 and indexed by the style module 220 based on the corresponding string of integers of the bitmask encoding 114 from which the personalized style 116 was generated.

In this manner, the personalization system 110 is configured to quickly identify a personalized style 116 for a bitmask encoding 114 received from a computing device 104 and return the personalized style 116 (e.g., for display in a user interface 120 output by the computing device 104). Advantageously, this enables the personalization system 110 to rapidly identify a personalized style 116 that corresponds to a received bitmask encoding 114 and return the at least one item 218 of the identified personalized style 116 for immediate display in the user interface 120, thereby providing a seamless user experience. Further, by indexing personalized styles 116 stored in the style database 222 using the bitmask encoding 114, the personalization system 110 is able to identify a personalized style 116, and at least one item 218 associated therewith, in a manner that requires minimal consumption of computational resources, which is not possible using conventional techniques.

Figure 5:
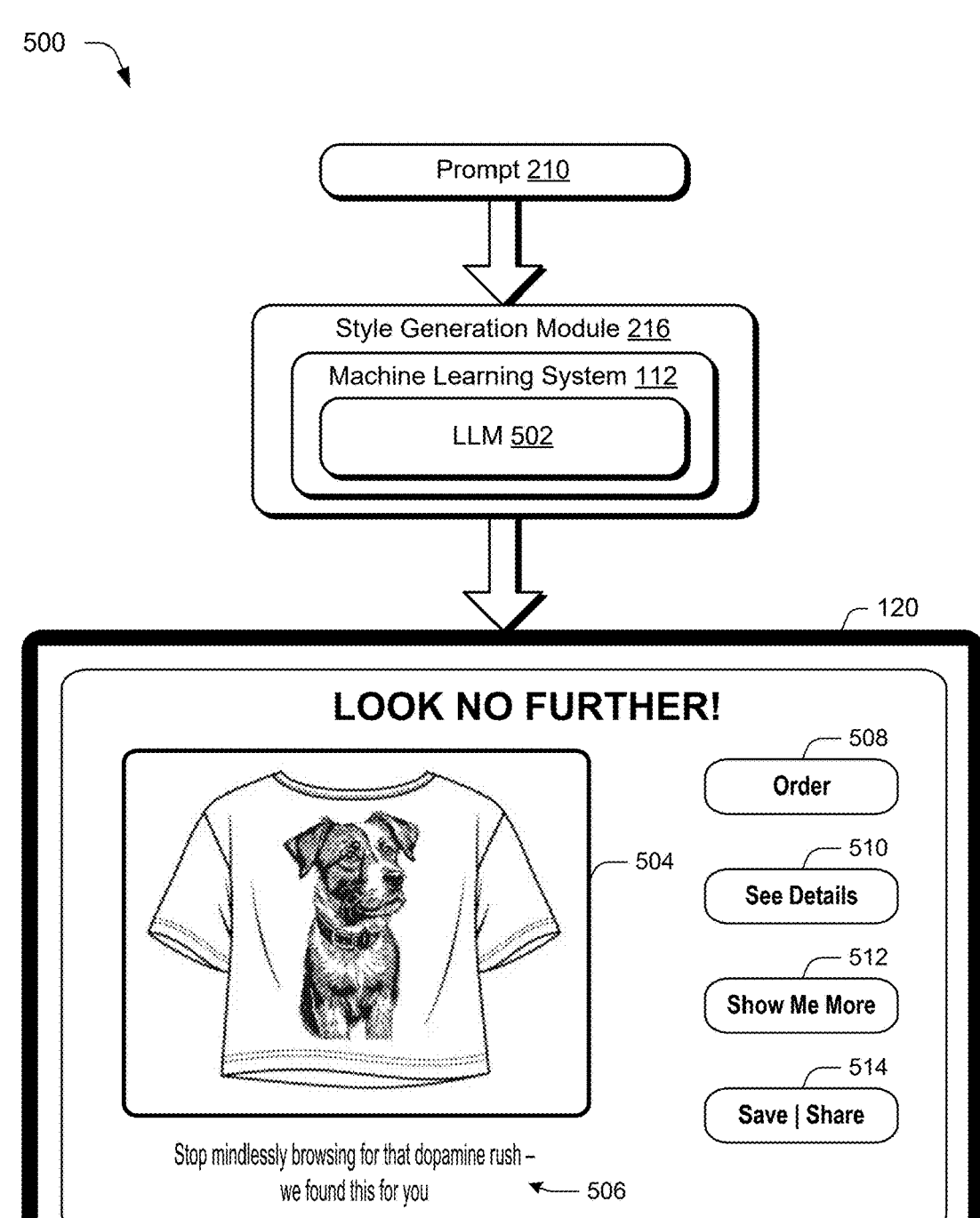
FIG. 5 depicts a system in an example implementation showing output of a user interface as displaying at least one item of a personalized style generated by a machine learning system based on a prompt generated by the personalization system of FIG. 1.

FIG. 5 depicts a system 500 in an example implementation showing output of a user interface 120 as displaying at least one item 218 of a personalized style 116 generated by the machine learning system 112 based on a prompt 210 generated by the personalization system 110. In the illustrated example of FIG. 5, the style generation module 216 is depicted as using a LLM 502 of the machine learning system 112 to generate a personalized style 116 based on the input prompt 210. The LLM 502 is representative of at least one LLM built upon a transformer architecture, such that the LLM 502 is designed to handle sequential data and natural language processing tasks.

In some implementations, LLM 502 includes multiple layers of self-attention mechanisms, where each layer contains two main components: a multi-head self-attention mechanism and a feed-forward neural network. The self-attention mechanism enables the LLM 502 to focus on different parts of an input sequence (e.g., prompt 210) simultaneously, capturing dependencies between words or tokens regardless of their position in the sequence. This LLM architecture is scaled to numerous (e.g., billions or even trillions) of parameters, with layers stacked deeply (e.g., hundreds of layers) to capture complex patterns and representations.

In implementations, a LLM implemented by the style generation module 216 is pre-trained on vast amounts of text data, where the LLM 502 learns to predict missing or next tokens based on context, leading to the emergence of a rich latent space representation of language. After pre-training, fine-tuning on specific tasks or domain-specific data is utilized to enhance performance for particular applications (e.g., outputting personalized style 116 based on the prompt 210). In implementations, parameters of the LLM 502 are optimized using variants of stochastic gradient descent (e.g., Adam), making the LLM 502 capable of handling a wide range of natural language understanding and generation tasks.

An output generated by the LLM 502, as displayed in the user interface 120, includes a digital content item 504, which is representative of an instance of digital content that was not included in the deck of cards from which the bitmask encoding 114 was generated and is likely to be of interest to a user from which the bitmask encoding 114 was received. Specifically, in the illustrated example of FIG. 5, the digital content item 504 depicts a shirt featuring an image of a dog, identified by the style generation module 216 as being an item 218 included in a personalized style 116 generated based on the prompt 210. The user interface 120 further depicts a tagline 506, generated as part of the personalized style 116 based on the example prompt 210 described above and illustrated in FIG. 4.

In the context of being displayed as part of a digital marketplace service offered by the service provider system 102, the user interface 120 further includes selectable controls, such as control 508, control 510, control 512, and control 514. Control 508 is selectable by a user of the computing device 104 to order a product, represented by the digital content item 504, offered for sale via the digital marketplace service. Control 510 is selectable to navigate from a current display of the user interface 120 to information associated with the digital content item 504, such as a listing page for a product represented by the digital content item 504. Control 512 is selectable to display a different item 218 included in the personalized style 116 as generated by the style generation module 216, and control 514 is selectable to perform one or more functions pertaining to the digital content item 504, such as to share the digital content item 504 with another user, save the digital content item 504 for subsequent viewing, and so forth. Although FIG. 5 depicts the user interface 120 as displaying a single item included in the personalized style 116, the described techniques are not so limited, and the personalization system 110 is configured to cause display of data associated with the personalized style 116 in any suitable manner via the user interface 120.

Having considered example systems and techniques for generating a personalized style that includes at least one item identified based on a bitmask encoding, consider now example procedures to illustrate aspects of the techniques described herein.

Example Procedures

The following discussion describes techniques that are configured to be implemented utilizing the systems and devices described herein. Aspects of each of the procedures are configured for implementation in hardware, firmware, software, or a combination thereof. The procedures are shown as a set of blocks that specify operations performed by one or more devices and are not limited to the orders shown for performing the operations by the respective blocks. In portions of the following discussion, reference is made to FIGS. 1-5.

FIG. 6 depicts a procedure 600 in an example implementation of the computing device 104 as generating a bitmask encoding 114 and outputting a display of a personalized style 116 generated based on the bitmask encoding 114.

To begin, a plurality of instances of digital content are displayed in a defined sequence (block 602). The computing device 104, for instance, displays a deck of cards in the user interface 120, where the deck of cards is organized in a sequence defined by the service provider system 102 and where individual cards in the deck of cards correspond to a different instance of digital content, such as digital content 122. In implementations, the deck of cards is displayed adjacent to indicators, such as indicator 124 and indicator 126, which represent binary classifications of a user's response to respective instances of digital content in the defined sequence.

Input is then received indicating a favorable response or an unfavorable response to each of the plurality of instances of digital content (block 604). The computing device 104, for instance, receives user input 128 at the user interface 120 in the form of a directional swipe gesture that moves individual cards in the deck of cards towards indicator 124 or indicator 126. User input 128 moving the card depicting digital content 122 towards the indicator 124, for instance, indicates an unfavorable response by a user of the computing device 104, while user input 128 moving the card towards the indicator 126 indicates a favorable response.

For each instance of digital content included in the defined sequence, a determination is made as to whether the received input indicates a favorable response (block 606). In response to detecting a favorable response for the corresponding instance of digital content, a first binary value is output (block 608). The computing device 104, for instance, outputs a value of one in response to detecting that the user input 128 swipes the card depicting the digital content 122 towards indicator 126. Conversely, in response to detecting an unfavorable response for the corresponding instance of digital content, a second binary value is output (block 610). The computing device 104, for instance, outputs a value of zero in response to detecting that the user input 128 swipes the card depicting the digital content 122 towards indicator 124.

A bitmask encoding is then generated by combining the binary values into a sting based on the defined sequence (block 612). The computing device 104, for instance, orders the binary value output for each instance of digital content according to an ordering of the instances of digital content in the defined sequence. For example, the computing device 104 places value 314 for digital content 302 in a first position of the values 326 representing the bitmask encoding 114, places value 316 for digital content 304 in a second position of the values 326 representing the bitmask encoding 114, and so forth.

At least one item associated with a personalized style that is generated based on the bitmask encoding is then output (block 614). The computing device 104, for instance, communicates the bitmask encoding 114 to the personalization system 110 and receives the personalized style 116 from the personalization system 110. The personalized style 116 is received as including at least one item 218, which the computing device 104 outputs for display in the user interface 120. For example, the computing device 104 outputs the digital content item 504 in the user interface 120.

FIG. 7 depicts a procedure 700 in an example implementation of generating a personalized style 116 based on a bitmask encoding 114 and presenting the personalized style 116 in a user interface 120.

To begin, a plurality of bitmask encodings are generated, where each of the plurality of bitmask encodings represents a unique combination of binary values for a defined sequence of items (block 702). The personalization system 110, for instance, generates a plurality of bitmask encodings 114 for a defined sequence of digital content instances, where each bitmask encoding 114 represents a unique combination of binary values (e.g., 0 or 1) for the defined sequence of items. Respective ones of the binary values are representative of a response to a corresponding item in the sequence, such as a positive sentiment/favorable response or a negative sentiment/unfavorable response.

Aspects associated with each item in the sequence of items are then identified (block 704). The aspect retrieval module 202, for instance, identifies a corresponding entry in the item database 204 for each item included in the defined sequence of items. From the identified entry, the aspect retrieval module 202 identifies aspects that describe the corresponding item included in the defined sequence of items.

For one of the plurality of bitmask encodings, weighted item aspects are generated by assigning a weight to the identified aspects based on a corresponding one of the binary values included in the bitmask encoding (block 706). The aspect retrieval module 202, for instance, generates weighted item aspects 206 for a bitmask encoding 114, where aspects corresponding to an item in the defined sequence of items are assigned a mathematical weight based on whether a corresponding binary value in the bitmask encoding 114 indicates a favorable response or an unfavorable response. The weighted item aspects 206 are thus generated such that aspects corresponding to an item in the defined sequence indicated as invoking a negative sentiment by a corresponding value in the bitmask encoding 114 are mathematically weighted to indicate disfavor. Conversely, the weighted item aspects 206 are generated such that aspects corresponding to an item in the defined sequence indicated as invoking a positive sentiment by a corresponding value in the bitmask encoding 114 are mathematically weighted to indicate favorableness.

For the one of the plurality of bitmask encodings, a prompt to generate a personalized style that includes at least one additional item not included in the defined sequence of items, based on the weighted item aspects, is generated (block 708). The prompt generation module 208, for instance, generates prompt 210 by populating portions of one or more templates 212 (e.g., first template 402 and second template 404) using the weighted item aspects 206.

The prompt is then input to one or more machine learning models to cause output of the personalized style (block 710). The style generation module 216, for instance, inputs the prompt 210 into one or more machine learning models of the machine learning system 112, such as LLM 502, which causes the machine learning system 112 to output the personalized style 116 as including the at least one item 218. Functionality represented by block 706, block 708, and block 710 is performed for each of the plurality of bitmask encodings, such that the personalization system 110 generates a personalized style 116 for each possible bitmask encoding 114 that may be returned from a defined sequence of items.

One of the personalized styles is then presented in a user interface (block 712). The personalization system 110, for instance, communicates a personalized style 116 to the computing device 104, where the communicated personalized style 116 corresponds to a bitmask encoding 114 received from the computing device 104. Upon receipt of the personalized style 116, the computing device 104 outputs the at least one item 218 for presentation in the user interface 120 via the display device 118.

Having described example procedures in accordance with one or more implementations, consider now an example system and device to implement the various techniques described herein.

Example System and Device

FIG. 8 illustrates an example system 800 that includes an example computing device 802 that is representative of one or more computing systems and/or devices that implement the various techniques described herein. This is illustrated through inclusion of the service provider system 102 and the personalization system 110. The computing device 802 is configurable, for example, as a server of a service provider, a device associated with a client (e.g., a client device), an on-chip system, and/or any other suitable computing device or computing system.

The example computing device 802 as illustrated includes a processing device 804, one or more computer-readable media 806, and one or more I/O interface 808 that are communicatively coupled, one to another. Although not shown, the computing device 802 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing device 804 is representative of functionality to perform one or more operations using hardware. Accordingly, the processing device 804 is illustrated as including hardware element 810 that is configurable as processors, functional blocks, and so forth. This includes implementation in hardware as an application specific integrated circuit or other logic device formed using one or more semiconductors. The hardware elements 810 are not limited by the materials from which they are formed, or the processing mechanisms employed therein. For example, processors are configurable as semiconductor(s) and/or transistors (e.g., electronic integrated circuits (ICs)). In such a context, processor-executable instructions are electronically executable instructions.

The computer-readable storage media 806 is illustrated as including memory/storage 812 that stores instructions that are executable to cause the processing device 804 to perform operations. The computer-readable storage medium is configured for storing instructions that, responsive to execution by the processing device, causes the processing device to perform operations. The memory/storage 812 represents memory/storage capacity associated with one or more computer-readable media. The memory/storage 812 includes volatile media (such as random-access memory (RAM)) and/or nonvolatile media (such as read only memory (ROM), Flash memory, optical disks, magnetic disks, and so forth). The memory/storage 812 includes fixed media (e.g., RAM, ROM, a fixed hard drive, and so on) as well as removable media (e.g., Flash memory, a removable hard drive, an optical disc, and so forth). The computer-readable media 806 is configurable in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 802. By way of example, and not limitation, computer-readable media includes "computer-readable storage media" and "computer-readable signal media."

"Computer-readable storage media" refers to media and/or devices that enable persistent and/or non-transitory storage of information (e.g., instructions are stored thereon that are executable by a processing device) in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 802, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employed to implement various techniques described herein. Accordingly, software, hardware, or executable modules are implemented as one or more instructions and/or logic embodied on some form of computer-readable storage media and/or by one or more hardware elements 810. The computing device 802 is configured to implement particular instructions and/or functions corresponding to the software and/or hardware modules. Accordingly, implementation of a module that is executable by the computing device 802 as software is achieved at least partially in hardware, e.g., through use of computer-readable storage media and/or hardware elements 810 of the processing device 804. The instructions and/or functions are executable/operable by one or more articles of manufacture (for example, one or more computing devices 802 and/or processing devices 804) to implement techniques, modules, and examples described herein.

The techniques described herein are supported by various configurations of the computing device 802 and are not limited to the specific examples of the techniques described herein. This functionality is also implementable all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 include applications and/or data that can be utilized while computer processing is executed on servers that are remote from the computing device 802. Resources 818 can also include services provided over the Internet and/or through a subscriber network, such as a cellular or Wi-Fi network.

The platform 816 abstracts resources and functions to connect the computing device 802 with other computing devices. The platform 816 also serves to abstract scaling of resources to provide a corresponding level of scale to encountered demand for the resources 818 that are implemented via the platform 816. Accordingly, in an interconnected device embodiment, implementation of functionality described herein is distributable throughout the system 800. For example, the functionality is implementable in part on the computing device 802 as well as via the platform 816 that abstracts the functionality of the cloud 814.

In implementations, the platform 816 employs a "machine-learning model" that is configured to implement the techniques described herein. A machine-learning model refers to a computer representation that can be tuned (e.g., trained and retrained) based on inputs to approximate unknown functions. In particular, the term machine-learning model can include a model that utilizes algorithms to learn from, and make predictions on, known data by analyzing training data to learn and relearn to generate outputs that reflect patterns and attributes of the training data. Examples of machine-learning models include neural networks, convolutional neural networks (CNNs), long short-term memory (LSTM) neural networks, decision trees, and so forth.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
generating a plurality of bitmask encodings that each represent a unique combination of binary values based on user input indicating a favorable sentiment or an unfavorable sentiment towards individual items in a defined sequence of items, where individual ones of the binary values:
define the user input to a respective item in the defined sequence of items; and
indicate either the favorable sentiment or the unfavorable sentiment to the respective item;
identifying, for each item in the defined sequence of items, aspects associated with the item;
generating, for each of the plurality of bitmask encodings, weighted item aspects by assigning a weight to the identified aspects associated with the respective items in the defined sequence of items based on a corresponding one of the binary values included in the bitmask encoding;
generating, for each of the plurality of bitmask encodings, a prompt to initiate generation of a personalized style that includes at least one item not included in the defined sequence of items based on the weighted item aspects corresponding to the bitmask encoding, using one or more machine learning models;
generating a plurality of personalized styles using the one or more machine learning models and the prompt generated for each of the plurality of bitmask encodings; and
presenting one of the plurality of personalized styles for output via a user interface.

2. The method of claim 1, further comprising:
communicating the defined sequence of items for presentation in the user interface at a client device;
receiving a bitmask encoding from the client device based on user input to the defined sequence of items as presented in the user interface; and
identifying the one of the plurality of personalized styles as corresponding to the bitmask encoding received from the client device.

3. The method of claim 1, wherein generating the prompt for one of the plurality of bitmask encodings comprises inserting the weighted item aspects corresponding to the one of the plurality of bitmask encodings into a template configured for input to the one or more machine learning models.

4. The method of claim 1, wherein the one or more machine learning models comprise a large language model trained on natural language processing tasks.

5. The method of claim 1, wherein generating the plurality of personalized styles comprises causing the one or more machine learning models to infer preferences based on the weighted item aspects.

6. The method of claim 1, further comprising storing the plurality of personalized styles in a style database indexed by a corresponding one of the plurality of bitmask encodings, wherein each of the plurality of personalized styles includes multiple items not included in the defined sequence of items.

7. The method of claim 1, wherein presenting the one of the plurality of personalized styles for output via the user interface comprises displaying the at least one item that is associated with the one of the plurality of personalized styles and is not included in the defined sequence of items.

8. A method comprising:
displaying a plurality of items in a defined sequence via a user interface;
receiving input indicating interest or disinterest for each of the plurality of items;
generating a bitmask encoding based on the received input, the bitmask encoding consisting of binary values that individually identify, for a corresponding one of the plurality of items, interest or disinterest specified by the received input;
causing a service provider system to communicate a personalized style that includes at least one additional item not included in the plurality of items by transmitting the bitmask encoding to the service provider system; and
displaying the at least one additional item included in the personalized style in the user interface.

9. The method of claim 8, wherein receiving the input indicating the interest or disinterest for each of the plurality of items comprises receiving a directional swipe gesture at the user interface for each of the plurality of items.

10. The method of claim 8, further comprising displaying a favorable indicator and an unfavorable indicator in the user interface adjacent to a display of the plurality of items in the defined sequence, wherein input indicating interest comprises movement of a card representing one of the plurality of items to the favorable indicator and input indicating disinterest comprises movement of the card representing the one of the plurality of items to the unfavorable indicator.

11. The method of claim 8, further comprising receiving the plurality of items in the defined sequence from the service provider system based on prior interactions by a computing device displaying the user interface and the service provider system, the prior interactions comprising at least one of a search query or a browsing history.

12. The method of claim 8, wherein generating the bitmask encoding comprises assigning a first binary value to indicate interest and assigning a second binary value to indicate disinterest.

13. The method of claim 8, wherein transmitting the bitmask encoding to the service provider system causes the service provider system to generate a prompt for input to one or more machine learning models based on the bitmask encoding, wherein the prompt is generated by inserting weighted item aspects derived from the bitmask encoding into a template configured for input to the one or more machine learning models, wherein the personalized style is generated by the one or more machine learning models based on the prompt.

14. The method of claim 8, wherein transmitting the bitmask encoding to the service provider system causes the service provider system to retrieve the personalized style from a style database that is indexed by a plurality of bitmask encodings, the plurality of bitmask encodings including the bitmask encoding.

15. A system comprising:
one or more processors; and
a computer-readable storage medium storing instructions that are executable by the one or more processors to perform operations comprising:
    presenting a plurality of digital content items in a defined sequence via a user interface;
    receiving input via the user interface indicating interest or disinterest in each of the plurality of digital content items;
    generating a bitmask encoding that consists of a plurality of binary values, each of the plurality of binary values corresponding to a respective one of the plurality of digital content items and identifying either interest or disinterest explicitly specified by the input via the user interface relative to the respective one of the plurality of digital content items;
    causing a service provider system to communicate a personalized style that includes at least one additional digital content item not included in the plurality of digital content items by transmitting the bitmask encoding to the service provider system; and
    displaying the at least one additional digital content item in the user interface.

16. The system of claim 15, wherein receiving the input indicating the interest or the disinterest to each of the plurality of digital content items comprises receiving a directional swipe gesture at the user interface for each of the plurality of digital content items.

17. The system of claim 15, wherein generating the bitmask encoding comprises assigning a first binary value to indicate interest and assigning a second binary value to indicate disinterest.

18. The system of claim 15, wherein transmitting the bitmask encoding to the service provider system causes the service provider system to generate a prompt for input to one or more machine learning models based on the bitmask encoding, wherein the prompt is generated by inserting weighted item aspects derived from the bitmask encoding into a template configured for input to the one or more machine learning models, wherein the personalized style is generated by the one or more machine learning models based on the prompt.

19. The system of claim 18, wherein the one or more machine learning models comprise a large language model trained on natural language processing tasks.

20. The system of claim 15, wherein transmitting the bitmask encoding to the service provider system causes the service provider system to retrieve the personalized style from a style database that is indexed by a plurality of bitmask encodings, the plurality of bitmask encodings including the bitmask encoding.

* * * * *